(12) United States Patent
Zhao et al.

(10) Patent No.: US 11,691,673 B1
(45) Date of Patent: Jul. 4, 2023

(54) OFF-ROAD ROBOT

(71) Applicant: China University of Mining & Technology, Beijing, Beijing (CN)

(72) Inventors: Jianwei Zhao, Beijing (CN); Zhe Wang, Beijing (CN); Jianshe Ma, Beijing (CN); An Qian, Beijing (CN); Yanxin Pang, Beijing (CN)

(73) Assignee: CHINA UNIVERSITY OF MINING & TECHNOLOGY, BEIJING, Beijing (CN)

(*) Notice: Subject to any disclaimer, the term of this patent is extended or adjusted under 35 U.S.C. 154(b) by 0 days.

(21) Appl. No.: 17/935,258

(22) Filed: Sep. 26, 2022

(30) Foreign Application Priority Data

Jan. 29, 2022 (CN) .......................... 202220243745.0

(51) Int. Cl.
| | | |
|---|---|---|
| *B62D 63/02* | (2006.01) | |
| *B62D 25/08* | (2006.01) | |
| *B62D 5/04* | (2006.01) | |
| *B62D 3/02* | (2006.01) | |
| *B62D 21/11* | (2006.01) | |
| *B60K 1/02* | (2006.01) | |
| *B60G 7/00* | (2006.01) | |

(52) U.S. Cl.
CPC ............. *B62D 21/11* (2013.01); *B60G 7/001* (2013.01); *B60K 1/02* (2013.01); *B62D 3/02* (2013.01); *B62D 5/0421* (2013.01); *B62D 25/08* (2013.01); *B62D 63/025* (2013.01)

(58) Field of Classification Search
CPC ........ B62D 21/11; B62D 3/02; B62D 5/0421; B62D 25/08; B62D 63/025; B60G 7/001; B60K 1/02
See application file for complete search history.

(56) References Cited

U.S. PATENT DOCUMENTS

| | | | |
|---|---|---|---|
| 9,494,940 B1* | 11/2016 | Kentley | .................... B60L 3/04 |
| 9,586,636 B1* | 3/2017 | Burmeister | .......... B62D 53/028 |
| 10,232,882 B2* | 3/2019 | Bertezzolo | ............. B62D 21/12 |
| 10,668,926 B2* | 6/2020 | Birnschein | ........... B60K 17/354 |
| 10,737,737 B2* | 8/2020 | Birnschein | .............. B60R 16/08 |
| 10,780,930 B1* | 9/2020 | Kentley-Klay | ...... B62D 65/022 |
| 11,485,211 B2* | 11/2022 | Shih | ...................... G07C 5/0808 |
| 2018/0345777 A1* | 12/2018 | Birnschein | ............ B60W 10/08 |
| 2021/0046985 A1* | 2/2021 | Claesson | .................. B60P 1/64 |
| 2021/0138887 A1* | 5/2021 | Shih | ......................... B60K 1/04 |
| 2021/0229700 A1* | 7/2021 | Claesson | ............. B62D 63/025 |

(Continued)

*Primary Examiner* — Kevin Hurley
*Assistant Examiner* — Michael R Stabley
(74) *Attorney, Agent, or Firm* — Hodgson Russ LLP

(57) ABSTRACT

Provided is an off-road robot, including a front side portion, a rear side portion and a middle portion. The front side portion includes a front vehicle frame, a front wheel and a first driving system; the front wheels and the first driving system are disposed at the front vehicle frame; and the first driving system drives the front wheels. The rear side portion includes a rear vehicle frame, a rear wheel and a second driving system; the rear wheel and the second driving system are disposed at the rear vehicle frame; and the second driving system drives the rear wheels. The middle portion includes a first frame and a second frame; the first frame and the second frame are detachably connected; the front vehicle frame is connected with the first frame; and the rear vehicle frame is connected with the second frame.

19 Claims, 3 Drawing Sheets

(56) References Cited

U.S. PATENT DOCUMENTS

| | | | |
|---|---|---|---|
| 2021/0240200 A1* | 8/2021 | Claesson | B60L 50/60 |
| 2021/0261208 A1* | 8/2021 | Claesson | B60P 3/42 |
| 2021/0269109 A1* | 9/2021 | Claesson | G05D 1/0282 |
| 2022/0009471 A1* | 1/2022 | Sjödin | B60L 15/20 |
| 2022/0026922 A1* | 1/2022 | Claesson | B60L 3/0092 |
| 2022/0041042 A1* | 2/2022 | Drabon | B60L 50/60 |
| 2022/0055702 A1* | 2/2022 | Claesson | B62D 65/04 |
| 2022/0348275 A1* | 11/2022 | Harmon | B60K 1/04 |

* cited by examiner

OFF-ROAD ROBOT

CROSS-REFERENCE TO RELATED APPLICATION

This application is based on and claims priority to the Chinese Patent Application No. 202220243745.0, filed on Jan. 29, 2022, the entire disclosure of which is incorporated herein by reference.

TECHNICAL FIELD

The present disclosure relates to the field of robots, and in particular to an off-road robot.

BACKGROUND

When an off-road robot assists humans to autonomously convey goods under the complex road conditions, in order to adapt to various complex driving environments, the off-road robot generally employs a solution that wheels are far away from a vehicle body and are connected with a vehicle through shock absorbers and a plurality of suspension rods. Therefore, the off-road robot has a relatively large volume. In the related art, the off-road robot has the problem of inconvenience in carrying.

SUMMARY

The present disclosure provides in embodiments an off-road robot with convenience in carry and transport of the off-road robot.

In some embodiments, the off-road robot includes a front side portion, a rear side portion and a middle portion. The front side portion includes a front vehicle frame, a front wheel and a first driving system; the front wheel and the first driving system are disposed at the front vehicle frame; and the first driving system drives the front wheels. The rear side portion includes a rear vehicle frame, a rear wheel and a second driving system; the rear wheel and the second driving system are disposed at the rear vehicle frame; and the second driving system drives the rear wheels. The middle portion includes a first frame and a second frame; the first frame and the second frame are detachably connected; the front vehicle frame is connected with the first frame; and the rear vehicle frame is connected with the second frame.

In some embodiments, the off-road robot further includes a first connecting block, a second connecting block and a fastener. The first connecting block is connected with the first frame; the second connecting block is connected with the second frame; and the first connecting block and the second connecting block are detachably connected through the fastener.

In some embodiments, the first frame has a plurality of first connecting portions; a plurality of the first connecting blocks are arranged, and correspond to the plurality of first connecting portions one to one; and each first connecting block is connected with a corresponding first connecting portion. The second frame has a plurality of second connecting portions; a plurality of the second connecting blocks are arranged, and correspond to the plurality of second connecting portions one to one; and each second connecting block is connected with a corresponding second connecting portion; wherein the plurality of the first connecting blocks are in one-to-one correspondence to the plurality of the second connecting blocks, and each first connecting block and the corresponding second connecting block are detachably connected through at least one fastener.

In some embodiments, the plurality of first connecting portions are disposed at intervals in a width direction of the off-road robot; and the plurality of second connecting portions are disposed at intervals in the width direction of the off-road robot.

In some embodiments, the front vehicle frame is swingably connected with the first frame; and the rear vehicle frame is swingably connected with the second frame.

In some embodiments, the off-road robot further includes a first supporting plate and a second supporting plate. The first supporting plate is detachably disposed at the front vehicle frame; the first driving system is disposed at the first supporting plate; the second supporting plate is detachably disposed at the rear vehicle frame; and the second driving system is disposed at the second supporting plate.

In some embodiments, the off-road robot further includes a steering system and a third supporting plate. The third supporting plate is detachably disposed at the front vehicle frame; the third supporting plate and the first supporting plate are disposed at an interval in an up-down direction; and the steering system is disposed at the third supporting plate.

In some embodiments, the steering system includes a steering gear and a steering motor; and the steering motor drives the steering gear and is a stepping motor.

In some embodiments, the front vehicle frame, the rear vehicle frame, the first frame and the second frame each are provided with an engaging lug; and a connecting hole is formed in each engaging lug.

In some embodiments, two front wheels are arranged; the two front wheels are disposed at an interval in the width direction of the off-road robot; the off-road robot includes two first independent suspensions; the two first independent suspensions are in one-to-one correspondence to the two front wheels; and each front wheel is connected with the front vehicle frame through the corresponding one of the first independent suspensions. Two rear wheels are arranged; the two rear wheels are disposed at an interval in the width direction of the off-road robot; the off-road robot includes two second independent suspensions; the two second independent suspensions are in one-to-one correspondence to the two rear wheels; and each rear wheel is connected with the rear vehicle frame through the corresponding one of the second independent suspensions.

In some embodiments, the first connecting block is connected with the first frame in a welding mode; and the second connecting block is connected with the second frame in the welding mode.

In some embodiments, the first connecting block is provided with a first through hole; the second connecting block is provided with a second through hole, corresponding to the first through hole; the fastener is a threaded fastener; and the first connecting block and the second connecting block are connected by the threaded fastener which penetrates through the first through hole and the second through hole.

In some embodiments, the off-road robot further includes: a first shock absorber and a second shock absorber, wherein the lower end of the first shock absorber is hinged to the front vehicle frame; the upper end of the first shock absorber is hinged to the first frame; the lower end of the second shock absorber is hinged to the rear vehicle frame; and the upper end of the second shock absorber is hinged to the second frame.

In some embodiments, two first shock absorbers are arranged; the two first shock absorbers are disposed at an interval in the left-right direction; the lower ends of the first shock absorbers are hinged to the front vehicle frame; the upper ends of the first shock absorbers are hinged to the first frame; and the first shock absorbers are inclined backward from bottom to top; and two second shock absorbers are arranged; the two second shock absorbers are disposed at an interval in the left-right direction; the lower ends of the second shock absorbers are hinged to the rear vehicle frame; the upper ends of the second shock absorbers are hinged to the second frame; and the second shock absorbers are inclined forward from bottom to top.

In some embodiments, each of the front vehicle frame, the rear vehicle frame, the first frame and the second frame is of a frame type structure; a first connecting rod, a second connecting rod, a third connecting rod and a fourth connecting rod are disposed between the front vehicle frame and the first frame at intervals from left to right in sequence; the first connecting rod and the fourth connecting rod are the same in length; the second connecting rod and the third connecting rod are the same in length; the upper end of each connecting rod is hinged to the first frame; the lower end of each connecting rod is hinged to the front vehicle frame; the first connecting rod, the second connecting rod, the third connecting rod and the fourth connecting rod are inclined backward from bottom to top and are distributed in a trapezoid shape; and a fifth connecting rod, a sixth connecting rod, a seventh connecting rod and an eighth connecting rod are disposed between the rear vehicle frame and the second frame at uniform intervals from left to right in sequence; the fifth connecting rod and the eighth connecting rod are the same in length; the sixth connecting rod and the seventh connecting rod are the same in length; the upper end of each connecting rod is hinged to the second frame; the lower end of each four connecting rod is hinged to the rear vehicle frame; the fifth connecting rod, the sixth connecting rod, the seventh connecting rod and the eighth connecting rod are inclined forward from bottom to top and are distributed in a trapezoid shape.

In some embodiments, the first independent suspensions and the second independent suspensions each are double-wishbone independent suspensions.

In some embodiments, each of the first independent suspension and the second independent suspension comprises an upper suspension and a lower suspension; the upper suspension is in a U shape; and the lower suspension is in a V shape.

In some embodiments, the first driving system comprises two first motors; the two first motors are in one-to-one correspondence to the two front wheels; each of the first motors drives the corresponding one of the front wheels; and each of the first motors is a wheel hub motor; and the second driving system comprises two second motors; the two second motors are in one-to-one correspondence to the two rear wheels; each of the second motors drives the corresponding one of the rear wheels; and each of the second motors is the wheel hub motor.

In some embodiments, the steering motor comprises a gear and a rack engaged with the gear; the gear is connected with the steering motor such that the steering motor drives the gear to rotate; the gear drives the rack to move in the left-right direction; the steering system further comprises a first pull rod, a second pull rod, a first connecting frame and a second connecting frame; the left front wheel is connected with the corresponding first independent suspension through the first connecting frame; and the right front wheel is connected with the corresponding first independent suspension through the second connecting frame; the left end of the first pull rod is hinged to the first connecting frame; the right end of the first pull rod is hinged to the left end of the rack; the left end of the second pull rod is hinged to the right end of the rack; and the right end of the second pull rod is hinged to the second connecting frame.

Figure 1:
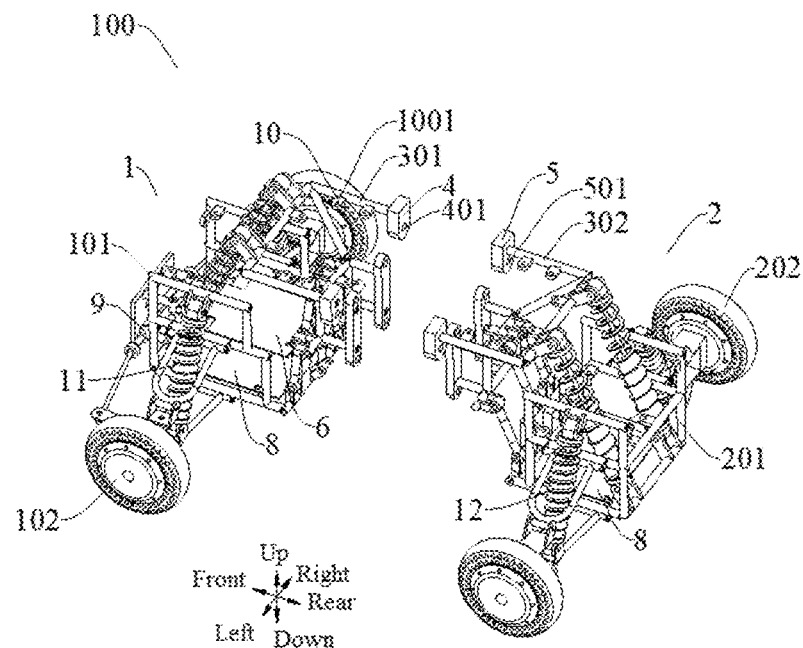
FIG. 1 is an exploded structural schematic diagram of an off-road robot according to an embodiment of the present disclosure.

REFERENCE NUMERALS off-road robot 100;
front side portion 1; front vehicle frame 101; front wheel 102;
rear side portion 2; rear vehicle frame 201; rear wheel 202;
middle portion 3; first frame 301; second frame 302;
first connecting block 4; first through hole 401;
second connecting block 5; second through hole 501;
first supporting plate 6;
second supporting plate 7;
third supporting plate 8;
steering system 9; gear 901; rack 902; first pull rod 903; second pull rod 904; first connecting frame 905; second connecting frame 906;
engaging lug 10; connecting hole 1001;
first independent suspension 11;
second independent suspension 12;
first shock absorber 13;
second shock absorber 14.

DETAILED DESCRIPTION

The embodiments of the present disclosure will be described in detail below, and examples of the embodiments are shown in the drawings. The following embodiments described with reference to the drawings are illustrative and are intended to be used for explaining the present disclosure, but may not be interpreted as the restrictions of the present disclosure.

The technical solutions of this application will be described in detail below with reference to the drawings.

As shown in FIGS. 1-7, in an embodiment, an off-road robot 100 includes a front side portion 1, a rear side portion 2 and a middle portion 3. The front side portion 1 includes a front vehicle frame 101, front wheels 102 and a first driving system; the front wheels 102 and the first driving system are disposed at the front vehicle frame 101; and the first driving system drives the front wheels 102. The rear side portion 2 includes a rear vehicle frame 201, rear wheels 202 and a 20 second driving system; the rear wheels 202 and the second driving system are disposed at the rear vehicle frame 201; and the second driving system drives the rear wheels 202. The middle portion 3 includes a first frame 301 and a second frame 302; the first frame 301 and the second frame 302 are detachably connected; the front vehicle frame 101 is connected with the first frame 301; and the rear vehicle frame 201 is connected with the second frame 302; wherein a front-back direction is consistent to a length direction of the off-road robot 100.

For the off-road robot 100 of the embodiments of the present disclosure, the first frame 301 and the second frame 302 are detachably connected; the front vehicle frame 101 is connected with the first frame 301; and the rear vehicle frame 201 is connected with the second frame 302. During transport of the off-road robot 100, the first frame 301 and the second frame 302 may be departed from each other firstly for convenience in separate carry and transport of the front side portion 1 and the rear side portion 2 of the off-road robot 100; and the front side portion 1 and the rear side portion 2 of the off-road robot 100 are assembled together through the first frame 301 and the second frame 302 after transported to a destination. Therefore, the off-road robot 100 of the embodiments of the present disclosure is convenient for carry and transport.

Thus, the off-road robot 100 of the embodiments of the present disclosure has the advantages of convenience in carry and transport.

The off-road robot 100 of the embodiments of the present disclosure further includes a first connecting block 4, a second connecting block 5 and a fastener (not shown in the drawings). The first connecting block 4 is connected with the first frame 301; the second connecting block 5 is connected with the second frame 302; and the first connecting block 4 and the second connecting block 5 are detachably connected through the fastener.

Thus, by disposing the first connecting block 4 at the first frame 301, disposing the second connecting block 5 at the second frame 302 and detachably connecting the first connecting block 4 with the second connecting block 5 through the fastener, connection between the first frame 301 and the second frame 302 is achieved; so that the first frame 301 and the second frame 302 are conveniently disassembled and assembled, and then the off-road robot 100 of the embodiments of the present disclosure is conveniently disassembled and assembled.

In an embodiment, the first connecting block 4 is connected with the first frame 301 in a welding mode; and the second connecting block 5 is connected with the second frame 302 in the welding mode.

In an embodiment, the first connecting block 4 is provided with a first through hole 401; the second connecting block 5 is provided with a second through hole 501, corresponding to the first through hole 401; the fastener is a threaded fastener; and the first connecting block 4 and the second connecting block 5 are connected by the threaded fastener which penetrates through the first through hole 401 and the second through hole 501.

Figure 2:
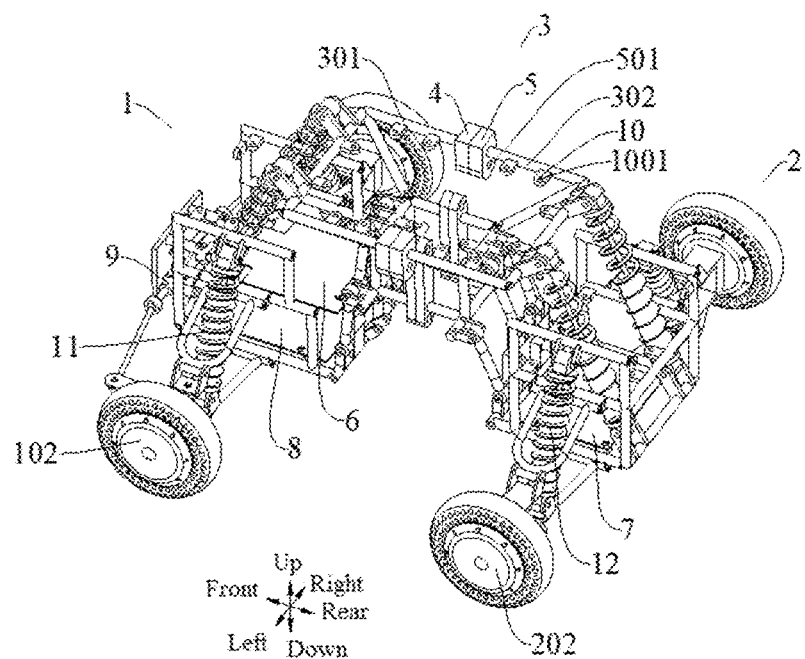
FIG. 2 is a structural schematic diagram of an off-road robot according to an embodiment of the present disclosure.

For example, as shown in FIG. 1 and FIG. 2, the first connecting block 4 is provided with a first through hole 401 penetrating in the front-back direction; the second connecting block 5 is provided with a second through hole 501 penetrating in the front-back direction; the threaded fastener is a bolt; the bolt penetrates through the first through hole 401 and the second through hole 501 in sequence from front to back and matches with nuts after screwed, such that the first connecting block 4 and the second connecting block 5 are fastened.

Thus, by providing the first connecting block 4 with the first through hole 401, providing the second connecting block 5 with the second through hole 501 and selecting the threaded fastener as the fastener, the first connecting block 4 and the second connecting block 5 are further conveniently disassembled and assembled; the first frame 301 and the second frame 302 are further conveniently disassembled and assembled; and then the off-road robot 100 of the embodiments of the present disclosure is further conveniently disassembled and assembled.

In some embodiments, the first frame 301 has a plurality of first connecting portions; a plurality of the first connecting blocks 4 are arranged; the plurality of the first connecting blocks 4 are in one-to-one correspondence to the plurality of first connecting portions; and each of the plurality of the first connecting blocks 4 is connected with the corresponding one of the plurality of first connecting portions. The second frame 302 has a plurality of second connecting portions; a plurality of the second connecting blocks 5 are arranged; the plurality of the second connecting blocks 5 are in one-to-one correspondence to the plurality of second connecting portions; and each of the plurality of the second connecting blocks 5 is connected with the corresponding one of the plurality of second connecting portions; wherein the plurality of the first connecting blocks 4 are in one-to-one correspondence to the plurality of the second connecting blocks 5, and each of the plurality of the first connecting blocks 4 and the corresponding one of the plurality of the second connecting blocks 5 are detachably connected through at least one fastener.

Figure 3:
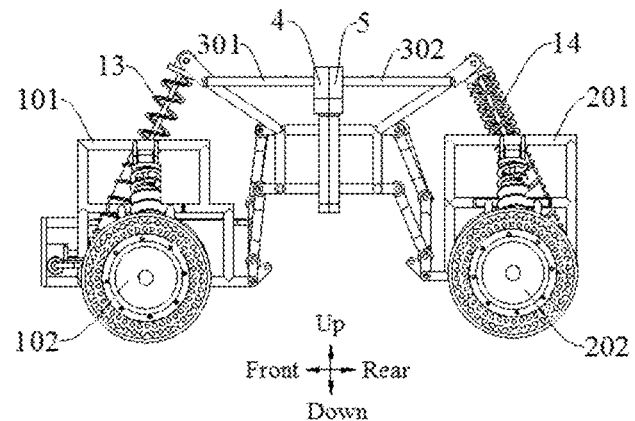
FIG. 3 is a side view of an off-road robot according to an embodiment of the present disclosure.
Figure 4:
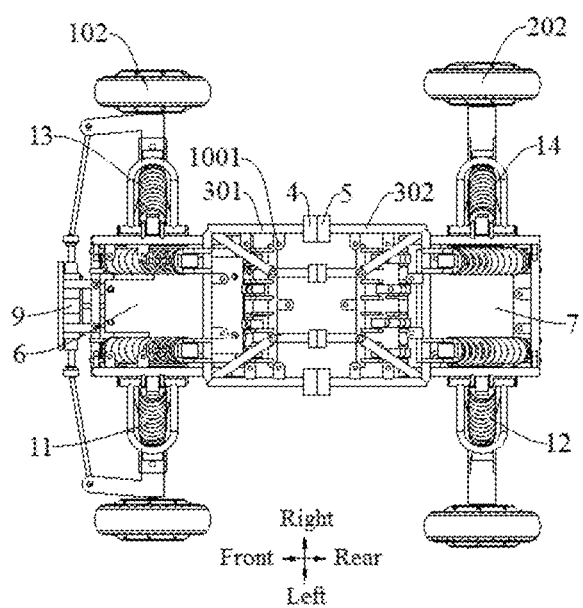
FIG. 4 is a top view of an off-road robot according to an embodiment of the present disclosure.

For easier understanding of the technical solution of the present disclosure, the situation that a width direction of the off-road robot 100 is consistent to a left-right direction, and a height direction of the off-road robot 100 is consistent to an up-down direction is taken as an example blow for further description of the technical solution of this application; wherein the left-right direction is shown in FIGS. 1-7, and the up-down direction is shown in FIGS. 1-3.

For example, as shown in FIG. 1 and FIG. 2, the first frame 301 is provided with four first connecting portions, the four first connecting portions are disposed in the left-right direction, and one first connecting block 4 is connected to each of the first connecting portions; and the second frame 302 is provided with four second connecting portions, the four second connecting portions are disposed in the left-right direction, and one second connecting block 5 is connected to each of the second connecting portions; wherein the leftmost first connecting block 4 is connected with the leftmost second connecting block 5 through one fastener; the rightmost first connecting block 4 is connected with the rightmost second connecting block 5 through one fastener; the middle left first connecting block 4 is connected with the middle left second connecting block 5 through two fasteners disposed up and down; and the middle right first connecting block 4 is connected with the middle right second connecting block 5 through two fasteners disposed up and down.

Thus, by arranging each of the numbers of the first connecting blocks 4 and the second connecting blocks 5 to be multiple and detachably connecting each of the first connecting blocks 4 with the corresponding one of the second connecting blocks 5 through at least one fastener, the connecting reliability between the first frame 301 and the second frame 302 is improved; the connecting reliability between the front side portion 1 and the rear side portion 2 is improved; and then the reliability of the off-road robot 100 of the embodiments of the present disclosure is improved.

In an embodiment, the plurality of first connecting portions are disposed at intervals in the width direction of the off-road robot 100; and the plurality of second connecting portions are disposed at intervals in the width direction of the off-road robot 100.

For example, as shown in FIG. 2, the plurality of first connecting portions are disposed at intervals in the left-right direction, and the plurality of second connecting portions are disposed at intervals in the left-right direction, so that stress between the first frame 301 and the second frame 302 is relatively uniform in distribution. Therefore, the connecting reliability between the first frame 301 and the second frame 302 is improved, and then the reliability of the off-road robot 100 of the embodiments of the present disclosure is further improved.

In an embodiment, the off-road robot 100 further includes a first shock absorber 13 and a second shock absorber 14. The lower end of the first shock absorber 13 is hinged to the front vehicle frame 101; the upper end of the first shock absorber 13 is hinged to the first frame 301; the lower end of the second shock absorber 14 is hinged to the rear vehicle frame 201; and the upper end of the second shock absorber 14 is hinged to the second frame 302.

Figure 5:
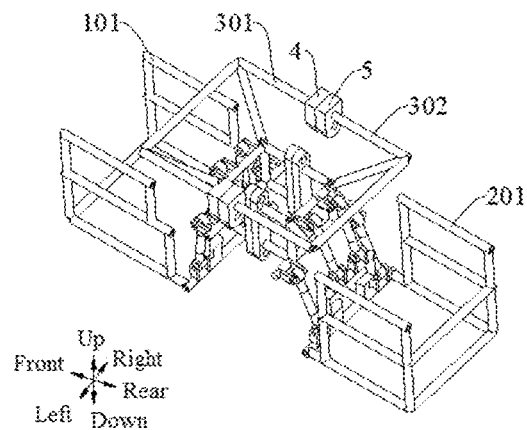
FIG. 5 is a structural schematic diagram of a front vehicle frame, a rear vehicle frame and a middle portion in FIG. 2.
Figure 6:
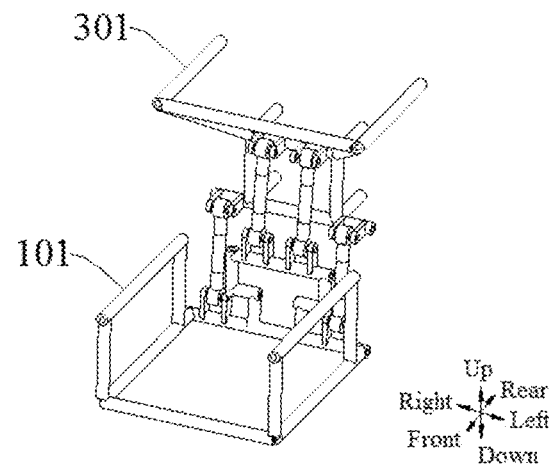
FIG. 6 is a structural schematic diagram of a front vehicle frame and a first frame in FIG. 5.

For example, as shown in FIG. 5 and FIG. 6, two first shock absorbers 13 are arranged; the two first shock absorbers 13 are disposed at an interval in the left-right direction; the lower ends of the first shock absorbers 13 are hinged to the front vehicle frame 101; the upper ends of the first shock absorbers 13 are hinged to the first frame 301; and the first shock absorbers 13 are inclined backward from bottom to top. Two second shock absorbers 14 are arranged; the two second shock absorbers 14 are disposed at an interval in the left-right direction; the lower ends of the second shock absorbers 14 are hinged to the rear vehicle frame 201; the upper ends of the second shock absorbers 14 are hinged to the second frame 302; and the second shock absorbers 14 are inclined forward from bottom to top.

Thus, by arranging the first shock absorber 13 and the second shock absorber 14, when the off-road robot 100 encounters an obstacle, the shock absorbers can elastically deform in a length direction thereof to damp a vehicle frame and then enable the off-road robot 100 to adapt to various terrains; and therefore, the adaptability of the off-road robot 100 of the embodiments of the present disclosure is improved.

In an embodiment, each of the front vehicle frame 101, the rear vehicle frame 201, the first frame 301 and the second frame 302 is of a frame type structure. In an embodiment, the front vehicle frame 101 is swingably connected with the first frame 301 in the up-down direction; and the rear vehicle frame 201 is swingably connected with the second frame 302 in the up-down direction. In another word, the front vehicle frame 101 is hinged to the first frame 301; and the rear vehicle frame 201 is hinged to the second frame 302.

For example, as shown in FIG. 5 and FIG. 6, four connecting rods are disposed between the front vehicle frame 101 and the first frame 301 and are a first connecting rod, a second connecting rod, a third connecting rod and a fourth connecting rod from left to right in sequence; the first connecting rod and the fourth connecting rod are the same in length; and the second connecting rod and the third connecting rod are the same in length. The four connecting rods are disposed at intervals in the left-right direction; the upper end of each of the four connecting rods is hinged to the first frame 301; the lower end of each of the four connecting rods is hinged to the front vehicle frame 101; and the four connecting rods are inclined backward from bottom to top and are distributed in a trapezoid shape.

Four connecting rods are disposed between the rear vehicle frame 201 and the second frame 302 and are a fifth connecting rod, a sixth connecting rod, a seventh connecting rod and an eighth connecting rod from left to right in sequence; the fifth connecting rod and the eighth connecting rod are the same in length; and the sixth connecting rod and the seventh connecting rod are the same in length. The four connecting rods are disposed at uniform intervals in the left-right direction; the upper end of each of the four connecting rods is hinged to the second frame 302; and the lower end of each of the four connecting rods is hinged to the rear vehicle frame 201. The four connecting rods are inclined forward from bottom to top and are distributed in a trapezoid shape.

Thus, for the off-road robot 100 of the embodiments of the present disclosure, by arranging each of the front vehicle frame 101, the rear vehicle frame 201, the first frame 301 and the second frame 302 to be of a frame type structure, swingably connecting the front vehicle frame 101 with the first frame 301 in the up-down direction and swingably connecting the rear vehicle frame 201 with the second frame 302 in the up-down direction, when the off-road robot 100 encounters the obstacle, the front side portion 1 and the rear side portion 2 vary by angle in the up-down direction to adapt to various terrains; and therefore, the adaptability of the off-road robot 100 of the embodiments of the present disclosure is further improved.

In some embodiments, two front wheels 102 are arranged; the two front wheels 102 are disposed at an interval in the width direction of the off-road robot 100; the off-road robot 100 includes two first independent suspensions 11; the two first independent suspensions 11 are in one-to-one correspondence to the two front wheels 102; and each of the two front wheels 102 is connected with the front vehicle frame 101 through the corresponding one of the first independent suspensions 11. Two rear wheels 202 are arranged; the two rear wheels 202 are disposed at an interval in the width direction of the off-road robot 100; the off-road robot 100 includes two second independent suspensions 12; the two second independent suspensions 12 are in one-to-one correspondence to the two rear wheels 202; and each of the two rear wheels 202 is connected with the rear vehicle frame 201 through the corresponding one of the second independent suspensions 12.

For example, the first independent suspensions 11 and the second independent suspensions 12 each are double-wishbone independent suspensions.

As shown in FIG. 1 and FIG. 2, the two front wheels 102 are disposed in the left-right direction; the two rear wheels 202 are disposed in the left-right direction; and each of the two front wheels 102 and the two rear wheels 202 is connected with the corresponding vehicle frame through the corresponding independent suspension; so that when the off-road robot 100 of the embodiments of the present disclosure encounters the obstacle, up-down movement of the wheel at single side may be achieved to enable the off-road robot 100 to go over the obstacle. Therefore, the obstacle climbing ability of the off-road robot 100 of the embodiments of the present disclosure is improved.

In an embodiment, each of the first independent suspension 11 and the second independent suspension 12 includes an upper suspension and a lower suspension; the upper suspension is in a U shape; and the lower suspension is in a V shape.

In some embodiments, the first driving system includes two first motors; the two first motors are in one-to-one correspondence to the two front wheels 102; each of the first motors drives the corresponding one of the front wheels 102; and each of the first motors is a wheel hub motor. The second driving system includes two second motors; the two second motors are in one-to-one correspondence to the two rear wheels 202; each of the second motors drives the corresponding one of the rear wheels 202; and each of the second motors is the wheel hub motor.

It could be understood that each wheel hub motor has the advantages of simple structure, high transmission efficiency and the like.

Thus, the front wheels 102 and the rear wheels 202 are driven by the wheel hub motors; the four wheels may be independently driven; and by controlling different speeds among the four wheels, the flexibility of a vehicle body structure of the off-road robot 100 of the embodiments of the present disclosure may be further improved.

In some embodiments, the off-road robot 100 of the embodiments of the present disclosure further includes a first supporting plate 6 and a second supporting plate 7. The first supporting plate 6 is detachably disposed at the front vehicle frame 101; and the first driving system is disposed at the first supporting plate 6. The second supporting plate 7 is detachably disposed at the rear vehicle frame 201; and the second driving system is disposed at the second supporting plate 7.

For the off-road robot 100 of the embodiments of the present disclosure, when the front side portion 1 is assembled, the first driving system is mounted at the first supporting plate 6; then the first supporting plate 6 is mounted at the front vehicle frame 101 through the bolt; and thus production and assembly of the front side portion 1 is facilitated. The second driving system is mounted at the second supporting plate 7; then the second supporting plate 7 is mounted at the rear vehicle frame 201 through the bolt; and thus production and assembly of the rear side portion 2 is facilitated.

Thus, by arranging the first supporting plate 6 and the second supporting plate 7 at the off-road robot 100, detachably connecting the first supporting plate 6 with the front vehicle frame 101 and detachably connecting the second supporting plate 7 with the rear vehicle frame 201, mounting of the first driving system and the second driving system is facilitated, and then assembly of the off-road robot 100 of the embodiments of the present disclosure is facilitated.

In some embodiments, the off-road robot 100 of the embodiments of the present disclosure further includes a steering system 9 and a third supporting plate 8. The third supporting plate 8 is detachably disposed at the front vehicle frame 101; the third supporting plate 8 and the first supporting plate 6 are arranged in the up-down direction at an interval; and the steering system 9 is disposed at the third supporting plate 8.

As shown in FIG. 1 and FIG. 2, the first supporting plate 6 is disposed above the third supporting plate 8. For the off-road robot 100 of the embodiments of the present disclosure, when the steering system 9 is assembled, the steering system 9 is mounted at the third supporting plate 8 firstly; then the third supporting plate 8 is mounted at the front vehicle frame 101 through the bolt; and thus assembly of the steering system 9 is finished.

Thus, by arranging the third supporting plate 8 at the off-road robot 100 and detachably connecting the third supporting plate 8 with the front vehicle frame 101, mounting of the steering system 9 is facilitated, and then assembly of the off-road robot 100 of the embodiments of the present disclosure is further facilitated.

Figure 7:
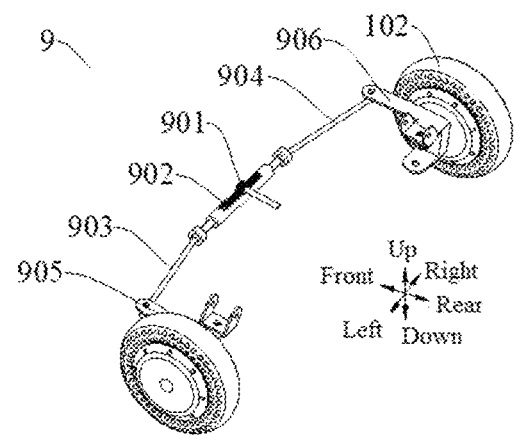
FIG. 7 is a structural schematic diagram of a steering system of an off-road robot in FIG. 1.

In some embodiments, as shown in FIG. 7, the steering system 9 includes a steering gear and a steering motor (not shown in the drawing); and the steering motor drives the steering gear and is a stepping motor.

Thus, steering of the off-road robot 100 is achieved by controlling the steering gear by the steering motor, so that the off-road robot 100 may remain to achieve smooth steering when having a very large load, and then the reliability of the embodiment of the present disclosure is further improved.

In an embodiment, as shown in FIG. 7, the steering motor includes a gear 901 and a rack 902 engaged with the gear 901, the gear 901 is connected with the steering motor such that the steering motor drives the gear 901 to rotate, and the gear 901 drives the rack 902 to move in the left-right direction; the steering system 9 further includes a first pull rod 903, a second pull rod 904, a first connecting frame 905 and a second connecting frame 906; the left front wheel 102 is connected with the corresponding first independent suspension 11 through the first connecting frame 905, and the right front wheel 102 is connected with the corresponding first independent suspension 11 through the second connecting frame 906; the left end of the first pull rod 903 is hinged to the first connecting frame 905, and the right end of the first pull rod 903 is hinged to the left end of the rack 902; and the left end of the second pull rod 904 is hinged to the right end of the rack 902, and the right end of the second pull rod 904 is hinged to the second connecting frame 906.

In an embodiment, the first connecting frame 905 and the second connecting frame 906 are in a claw shape.

For example, as shown in FIG. 7, when in use, the steering motor drives the gear 901 to rotate from left to right; the gear 901 drives the rack 902 to move from right to left; the rack 902 drives the first pull rod 903 and the second pull rod 904 to move from right to left; the first pull rod 903 drives the first connecting frame 905 to rotate from right to left; the second pull rod 904 drives the second connecting frame 906 to rotate from right to left; and then leftward steering of the front wheels 102 is achieved.

Thus, for the off-road robot 100 of the embodiments of the present disclosure, a gear 901-rack 902 form is arranged through the steering gear; the rack 902 drives the pull rods to move; the pull rods drive the connecting frames to rotate to achieve steering of the front wheels 102; and therefore, steering of the off-road robot 100 of the embodiments of the present disclosure is further flexible.

In some embodiments, the front vehicle frame 101, the rear vehicle frame 201, the first frame 301 and the second frame 302 each are provided with an engaging lug 10; and a connecting hole 1001 is formed in each engaging lug 10.

For example, as shown in FIG. 1 and FIG. 2, each of the front vehicle frame 101, the rear vehicle frame 201, the first frame 301 and the second frame 302 is provided with a plurality of engaging lugs 10. When it requires extended mounting of a new module at the front side portion 1, the rear side portion 2 or the middle portion 3, the new module may be added by adding a supporting plate through the connecting hole 1001 at the engaging lug 10, or the new module is directly mounted oat the engaging lug 10.

Thus, by arranging the engaging lug 10 at the off-road robot 100 of the embodiments of the present disclosure for mounting the new module, the extensibility of the off-road robot 100 of the embodiments of the present disclosure is improved.

In an embodiment, a plurality of engaging lug 10 are arranged at each of the front vehicle frame 101, the rear vehicle frame 201, the first frame 301 and the second frame 302.

The off-road robot of the embodiments of the present disclosure has the following beneficial effects that:

1. The front side portion and the rear side portion of the off-road robot are detachably connected through the first frame and the second frame, so that the off-road robot is convenient for carry and transport;

2. By arranging the connecting rod and the shock absorber for the vehicle body structure of the off-road robot, the off-road robot is more flexible in vehicle body structure and has better obstacle climbing performance;

3. The steering system of the off-road robot employs the steering gear as a core, so that the off-road robot may remain to achieve smooth steering when have a very large load;

4. By employing the double-wishbone independent suspension system, when the off-road robot encounters the obstacle by the wheels at the single side, the degree of freedom of up-down movement may be obtained, and then the obstacle climbing ability is improved; and 5. Due to four-wheel independent drive of the off-road robot by matching with the flexible vehicle body structure, a vehicle body form may be changed, and more functions are achieved.

In description of the present disclosure, it should be understood that orientations or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "peripheral" and the like are based on orientations or positional relationships shown in the drawings, are to facilitate the description of the present disclosure and simplify the description merely, do not indicate or imply that the referred apparatuses or elements must have specific orientations and are constructed and operated in the specific orientations and thus should not be construed to limit the present disclosure.

In addition, the terms "first" and "second" are used only for description and shall not be interpreted as an indication or implication of relative importance or an implicit indication of the number of technical features. Thus, features defined with "first" and "second" may include at least one such feature, either explicitly or implicitly. In the description of the present disclosure, "a plurality" means at least two, for example, two, three or the like, unless otherwise specifically defined.

In the present disclosure, unless clearly specified and limited otherwise, the terms "mounted", "connected", "attached", "fixed" and the like should be interpreted broadly. For example, it may be fixed connection, detachable connection or connection in to a whole body; it may be mechanical connection, electrical connection or mutual communication; and it may be direct connection, indirect connection through an intermediary, communication between the interiors of two elements or mutual interaction of the two elements, unless clearly limited otherwise. For one of ordinary skill in the art, the specific meanings of the above terms in the present disclosure may be understood according to the specific situations.

In the present disclosure, unless clearly specified and limited otherwise, a first feature "above" or "below" a second feature may be direct contact between the first feature and the second feature, or may be indirect contact between the first feature and the second feature through an intermediary. Moreover, the first feature "on", "above" and "over" the second feature may be a situation that the first feature is formed right above or diagonally above the second feature, or merely represents that the first feature is higher than the second feature in horizontal height. The first feature "under", "below" and "beneath" the second feature may be a situation that the first feature is formed right below or diagonally below the second feature, or merely represents that the first feature is lower than the second feature in horizontal height.

In the present disclosure, the terms "one embodiment", "some embodiments", "example", "particular example", "some examples" or the like means that a particular feature, structure, material or characteristic described in connection with the embodiment or the example is included in at least one embodiment or example of the present disclosure. In the present specification, the schematic representation of the above terms does not necessarily mean the same embodiment or example. Moreover, the described particular feature, structure, material or characteristic may be combined in any one or more embodiments or examples in a suitable mode. In addition, various embodiments or examples described in the specification, as well as features of various embodiments or examples, may be combined and combined by those skilled in the art without contradicting each other.

Although the embodiments of the present disclosure have been shown and described above, it is understood that the above embodiments are illustrative, but may not be interpreted as the restrictions of the present disclosure; and one of ordinary skill in the art may make changes, modifications, substitutions and variations within the scope of the resent disclosure.

What is claimed is:

1. An off-road robot, comprising:
a front side portion, wherein the front side portion comprises a front vehicle frame, a front wheel and a first driving system, the front wheel and the first driving system are disposed at the front vehicle frame, and the first driving system drives the front wheel;
a rear side portion, wherein the rear side portion comprises a rear vehicle frame, a rear wheel and a second driving system, the rear wheel and the second driving system are disposed at the rear vehicle frame, and the second driving system drives the rear wheel;
a middle portion, wherein the middle portion comprises a first frame and a second frame; the first frame and the second frame are detachably connected; the front vehicle frame is connected with the first frame; and the rear vehicle frame is connected with the second frame;
a first connecting block, connected with the first frame;
a second connecting block, connected with the second frame; and
a fastener, wherein the first connecting block and the second connecting block are detachably connected through the fastener;
wherein the first frame has a plurality of first connecting portions; a plurality of first connecting blocks are arranged, and correspond to the plurality of first connecting portions one to one; and each first connecting block is connected with a corresponding first connecting portion;
wherein the second frame has a plurality of second connecting portions; a plurality of second connecting blocks are arranged, and correspond to the plurality of second connecting portions one to one; and each second connecting block is connected with a corresponding second connecting portion; and wherein the plurality of first connecting blocks are in one-to-one correspondence to the plurality of second connecting blocks, and each first connecting block and the corresponding second connecting block are detachably connected through at least one fastener.

2. The off-road robot according to claim 1, wherein the plurality of first connecting portions are disposed at intervals in a width direction of the off-road robot; and the plurality of second connecting portions are disposed at intervals in the width direction of the off-road robot.

3. The off-road robot according to claim 1, wherein the front vehicle frame is swingably connected with the first frame, and the rear vehicle frame is swingably connected with the second frame.

4. The off-road robot according to claim 1, further comprising:
a first supporting plate, wherein the first supporting plate is detachably disposed at the front vehicle frame, and the first driving system is disposed at the first supporting plate; and
a second supporting plate, wherein the second supporting plate is detachably disposed at the rear vehicle frame, and the second driving system is disposed at the second supporting plate.

5. The off-road robot according to claim 4, further comprising:
a steering system; and
a third supporting plate, wherein the third supporting plate is detachably disposed at the front vehicle frame; the third supporting plate and the first supporting plate are disposed at an interval in an up-down direction; and the steering system is disposed at the third supporting plate.

6. The off-road robot according to claim 5, wherein the steering system comprises a steering gear and a steering motor; and the steering motor drives the steering gear and is a stepping motor.

7. The off-road robot according to claim 6, wherein:
the steering motor comprises a gear and a rack engaged with the gear;
the gear is connected with the steering motor such that the steering motor drives the gear to rotate;
the gear drives the rack to move in a left-right direction;
the steering system further comprises a first pull rod, a second pull rod, a first connecting frame and a second connecting frame;
a left front wheel is connected with the corresponding first independent suspension through the first connecting frame;
a right front wheel is connected with the corresponding first independent suspension through the second connecting frame;
a left end of the first pull rod is hinged to the first connecting frame;
a right end of the first pull rod is hinged to a left end of the rack;
a left end of the second pull rod is hinged to a right end of the rack; and
a right end of the second pull rod is hinged to the second connecting frame.

8. The off-road robot according to claim 1, wherein the front vehicle frame, the rear vehicle frame, the first frame and the second frame each are provided with an engaging lug; and a connecting hole is formed in each engaging lug.

9. The off-road robot according to claim 1, wherein two front wheels are arranged; the two front wheels are disposed at an interval in a width direction of the off-road robot; the off-road robot comprises two first independent suspensions; the two first independent suspensions are in one-to-one correspondence to the two front wheels; and each front wheel is connected with the front vehicle frame through the corresponding first independent suspension; and
two rear wheels are arranged; the two rear wheels are disposed at an interval in the width direction of the off-road robot; the off-road robot comprises two second independent suspensions; the two second independent suspensions are in one-to-one correspondence to the two rear wheels; and each rear wheel is connected with the rear vehicle frame through the corresponding second independent suspension.

10. The off-road robot according to claim 9, wherein the first independent suspensions and the second independent suspensions each are double-wishbone independent suspensions.

11. The off-road robot according to claim 9, wherein each of the first independent suspension and the second independent suspension comprises an upper suspension and a lower suspension; the upper suspension is in a U shape; and the lower suspension is in a V shape.

12. The off-road robot according to claim 9, wherein:
the first driving system comprises two first motors; the two first motors are in one-to-one correspondence to the two front wheels; each of the first motors drives the corresponding one of the front wheels; and each of the first motors is a wheel hub motor; and
the second driving system comprises two second motors; the two second motors are in one-to-one correspondence to the two rear wheels; each of the second motors drives the corresponding one of the rear wheels; and each of the second motors is the wheel hub motor.

13. The off-road robot according to claim 1, wherein the first connecting block is connected with the first frame in a welding mode, and the second connecting block is connected with the second frame in the welding mode.

14. The off-road robot according to claim 1, wherein:
the first connecting block is provided with a first through hole;
the second connecting block is provided with a second through hole, corresponding to the first through hole;
the fastener is a threaded fastener; and
the first connecting block and the second connecting block are connected by the threaded fastener which penetrates through the first through hole and the second through hole.

15. The off-road robot according to claim 1, further comprising: a first shock absorber and a second shock absorber, wherein:
a lower end of the first shock absorber is hinged to the front vehicle frame;
an upper end of the first shock absorber is hinged to the first frame;
a lower end of the second shock absorber is hinged to the rear vehicle frame; and
an upper end of the second shock absorber is hinged to the second frame.

16. The off-road robot according to claim 15, wherein:
two first shock absorbers are arranged; the two first shock absorbers are disposed at an interval in a left-right direction; the lower ends of the first shock absorbers are hinged to the front vehicle frame; the upper ends of the first shock absorbers are hinged to the first frame; and the first shock absorbers are inclined backward from bottom to top; and two second shock absorbers are arranged; the two second shock absorbers are disposed at an interval in the left-right direction; the lower ends of the second shock absorbers are hinged to the rear vehicle frame; the upper ends of the second shock absorbers are hinged to the second frame; and the second shock absorbers are inclined forward from bottom to top.

17. The off-road robot according to claim 1, wherein:

each of the front vehicle frame, the rear vehicle frame, the first frame and the second frame is of a frame structure, a first connecting rod, a second connecting rod, a third connecting rod and a fourth connecting rod are disposed between the front vehicle frame and the first frame at intervals from left to right in sequence; the first connecting rod and the fourth connecting rod are the same in length; the second connecting rod and the third connecting rod are the same in length; an upper end of each connecting rod is hinged to the first frame; a lower end of each connecting rod is hinged to the front vehicle frame; the first connecting rod, the second connecting rod, the third connecting rod and the fourth connecting rod are inclined backward from bottom to top and are distributed in a trapezoid shape; and a fifth connecting rod, a sixth connecting rod, a seventh connecting rod and an eighth connecting rod are disposed between the rear vehicle frame and the second frame at uniform intervals from left to right in sequence; the fifth connecting rod and the eighth connecting rod are the same in length; the sixth connecting rod and the seventh connecting rod are the same in length; an upper end of each connecting rod is hinged to the second frame; a lower end of each four connecting rod is hinged to the rear vehicle frame; the fifth connecting rod, the sixth connecting rod, the seventh connecting rod and the eighth connecting rod are inclined forward from bottom to top and are distributed in a trapezoid shape.

18. An off-road robot, comprising:

a front side portion, wherein the front side portion comprises a front vehicle frame, a front wheel and a first driving system, the front wheel and the first driving system are disposed at the front vehicle frame, and the first driving system drives the front wheel;

a rear side portion, wherein the rear side portion comprises a rear vehicle frame, a rear wheel and a second driving system, the rear wheel and the second driving system are disposed at the rear vehicle frame, and the second driving system drives the rear wheel; and a middle portion, wherein the middle portion comprises a first frame and a second frame; the first frame and the second frame are detachably connected; the front vehicle frame is connected with the first frame; and the rear vehicle frame is connected with the second frame;

wherein the front vehicle frame, the rear vehicle frame, the first frame and the second frame each are provided with an engaging lug; and a connecting hole is formed in each engaging lug.

19. An off-road robot, comprising:

a front side portion, wherein the front side portion comprises a front vehicle frame, a front wheel and a first driving system, the front wheel and the first driving system are disposed at the front vehicle frame, and the first driving system drives the front wheel;

a rear side portion, wherein the rear side portion comprises a rear vehicle frame, a rear wheel and a second driving system, the rear wheel and the second driving system are disposed at the rear vehicle frame, and the second driving system drives the rear wheel; and a middle portion, wherein the middle portion comprises a first frame and a second frame; the first frame and the second frame are detachably connected; the front vehicle frame is connected with the first frame; and the rear vehicle frame is connected with the second frame;

wherein two front wheels are arranged; the two front wheels are disposed at an interval in a width direction of the off-road robot; the off-road robot comprises two first independent suspensions; the two first independent suspensions are in one-to-one correspondence to the two front wheels; and each front wheel is connected with the front vehicle frame through the corresponding first independent suspension; and wherein two rear wheels are arranged; the two rear wheels are disposed at an interval in the width direction of the off-road robot; the off-road robot comprises two second independent suspensions; the two second independent suspensions are in one-to-one correspondence to the two rear wheels; and each rear wheel is connected with the rear vehicle frame through the corresponding second independent suspension.

\* \* \* \* \*